(12) United States Patent
Stein

(10) Patent No.: US 6,958,466 B1
(45) Date of Patent: Oct. 25, 2005

(54) METHOD AND SYSTEM FOR DETECTING TARGETS KNOWN UP TO A SIMPLEX FROM MULTI-SPECTRAL AND HYPER-SPECTRAL IMAGERY EMPLOYING THE NORMAL COMPOSITIONAL MODEL

(75) Inventor: David W. Stein, Concord, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 307 days.

(21) Appl. No.: 10/454,216

(22) Filed: Jun. 4, 2003

Related U.S. Application Data

(60) Provisional application No. 60/394,649, filed on Jul. 9, 2002, provisional application No. 60/394,708, filed on Jul. 9, 2002.

(51) Int. Cl.[7] .................................. G06M 7/00
(52) U.S. Cl. .................... 250/221; 250/208.1
(58) Field of Search ............... 250/221, 208.1, 250/201.5, 214.1, 226, 203.2, 203.6; 348/269, 348/263; 257/440, 291; 244/3.16, 3.17

(56) References Cited

U.S. PATENT DOCUMENTS 6,079,665 A * 6/2000 Nella et al. ............... 244/3.17

OTHER PUBLICATIONS

Stein, David W. J.; Modeling Variability In Hyperspectral Imagery Using A Stochastic Compositional Approach; Proceedings of the IEEE International Geoscience and Remote Sensing Symposium, IGARSS '01, Sydney Australia, Jul. 2001.

Stein, Dr. David W.; Hyperspectral Detection Processing Development; ILIR '01 SSC San Diego In-House Laboratory Independent Research 2001 Annual Report; pp. 63-66; SSC-San Diego Technical Document, May 2002, USA.

Stein, David W. J.; Stochastic Compositional Models Applied To Subpixel Analysis Of Hyperspectral Imagery; Proceedings of SPIE vol. 4480, Imaging Spectrometry VII, M. Descour and S. Shen eds.; San Diego CA 2001; USA.

* cited by examiner

*Primary Examiner*—Que T. Le
(74) *Attorney, Agent, or Firm*—Michael A. Kagan; Peter A. Lipovsky; Allan Y. Lee

(57) ABSTRACT

A method for detecting targets comprises: a) receiving spectral data; b) using a normal compositional model for estimating background parameters from the spectral data and target components; c) estimating abundance values of classes of the normal compositional model from the background parameters and the spectral data; d) estimating target class covariance values from the spectral data, the background parameters, and the target components; e) estimating target-plus-background abundance values from the target class covariance values, the background parameters, the spectral data, and the target components; f) employing a normal compositional model for determining a likelihood ratio detection statistic from the target class covariance values, target-plus-background abundance values, spectral data, target components, background parameters, and background abundance values; and g) generating a determination output signal that represents whether an observation includes a target from the likelihood ratio detection statistic.

14 Claims, 3 Drawing Sheets

METHOD AND SYSTEM FOR DETECTING TARGETS KNOWN UP TO A SIMPLEX FROM MULTI-SPECTRAL AND HYPER-SPECTRAL IMAGERY EMPLOYING THE NORMAL COMPOSITIONAL MODEL

CROSS-REFERENCES TO RELATED APPLICATIONS

This application claims the benefit of U.S. Provisional Application No. 60/394,649, filed 9 Jul. 2002, and is related by common inventorship and subject matter to the commonly-assigned U.S. Provisional Patent Application No. 60/394,708 entitled "System and Method for Detecting Anomalies in Multispectral and Hyperspectral Imagery Employing the Normal Compositional Model" filed on 9 Jul. 2002.

BACKGROUND OF THE INVENTION

Hyperspectral sensors are a new class of optical sensor that collect a spectrum from each point in a scene. They differ from multi-spectral sensors in that the number of bands is much higher (twenty or more), and the spectral bands are contiguous. For remote sensing applications, they are typically deployed on either aircraft or satellites. The data product from a hyperspectral sensor is a three-dimensional array or "cube" of data with the width and length of the array corresponding to spatial dimensions and the spectrum of each point as the third dimension. Hyperspectral sensors have a wide range of remote sensing applications including: terrain classification, environmental monitoring, agricultural monitoring, geological exploration, and surveillance. They have also been used to create spectral images of biological material for the detection of disease and other applications. Known target detection algorithms have been derived from several models of hyperspectral imagery.

The Gaussian mixture model has served as a basis for detecting known targets from hyperspectral and multispectral imagery. This approach models each datum as a realization of a random vector having one of several possible multivariate Gaussian distributions. If each observation, $y \in R^n$, arises from one of d normal classes then the data have a normal or Gaussian mixture probability density function:

$$p(y) = \sum_{k=1}^{d} \omega_k N(\mu_k, \Gamma_k)(y), \quad \omega_k \geq 0, \quad \sum_{k=1}^{d} \omega_k = 1, \quad \text{[Eqn. 1]}$$

where $\omega_k$ is the probability of class k and $$N(\mu_k, \Gamma_k)(y) = \frac{1}{(2\pi)^{\frac{n}{2}} |\Gamma_k|^{\frac{1}{2}}} \exp\left(\frac{-1}{2}(y-\mu_k)^T \Gamma_k^{-1}(y-\mu_k)\right)$$

is the normal probability density function having mean $\mu_k$ and covariance $\Gamma_{k^*}$. The parameters $\{(\omega_k, \mu_k, \Gamma_k) | 1 \leq k \leq d\}$ are typically estimated from the imagery using defined clusters, the expectation maximization algorithm or related algorithms such as the stochastic expectation maximization algorithm. Known target detection algorithms are generally implemented using a bank or a linear combination of the likelihood ratio detection statistics for each class. The covariance of the observations under the target present hypothesis is usually assumed to equal the covariance of the observations under the background only hypothesis. Thus the test for the presence of a target against background class k is often formulated as the likelihood ratio for the hypotheses:

$$H_{0,k}: y \sim N(\mu_k, \Gamma_k)$$

$$H_{1,k}: y \sim N(s, \Gamma_k),$$

where $s \in R^n$ is the spectrum of the target. In this case, the log of the likelihood ratio is equivalent to the spectral matched filter for a target against a background modeled by class k, i.e.

$$T_{MF}(y;k) = \frac{(s-\mu_k)^T \Gamma_k^{-1}(y-\mu_k)}{\sqrt{(s-\mu_k)^T \Gamma_k^{-1}(s-\mu_k)}}. \quad \text{[Eqn. 2]}$$

Linear and convex models have also served as the basis for formulating known target detection algorithms. In this approach the data are modeled as $$H_0: y = W\alpha_b + \eta$$

$$H_1: y = S\alpha_t + W\alpha_b + \eta, \quad \text{[Eqns. 3]}$$

where: W is an n×P matrix such that the columns of W span an interference subspace of dimension P; S is an n×Q matrix such that the columns of S span a signal subspace of dimension Q; $\eta$ is additive noise such that $\eta \sim N(0, \sigma^2 \Gamma)$. W, S, and $\Gamma$ are assumed known, and $\alpha_t \in R^Q$ and $\alpha_b \in R^P$ are assumed unknown. $\sigma^2$ may be known or unknown. Additionally, constraints may be placed on the coefficient vectors $\alpha_t$ and $\alpha_b$, e.g $$\sum_{i=1}^{Q} a_{ti} + \sum_{i=1}^{P} a_{bi} = 1, \quad \text{(c.1)}$$

$$a_{ti} \geq 0, a_{bi} \geq 0. \quad \text{(c.2)}$$

General procedures have not been developed for simultaneously estimating W and $\Gamma$. However, if either 1) $\alpha_b$ is locally constant or 2) the data may be segmented into regions such that $\alpha_b$ is essentially constant on each region, the term $W\alpha_b$ may be absorbed into the noise which is then modeled by $\eta \sim N(\mu, \Gamma)$, where the parameters $\mu$ and $\Gamma$ are estimated locally or for each segment. With W=0, $\Gamma$ may be estimated from background reference data, and if $\Gamma = I_{n \times n}$, a basis for W may be estimated as the eigenvectors of a background data correlation matrix having eigenvalues greater than $\sigma^2$, a threshold determined from the eigenspectrum of the data correlation matrix. Eqns. 3 apply a convex or linear model to the data if the constraints (c.1, c.2) are or are not imposed, respectively.

The linear models have been used by several practitioners in the art to derive likelihood ratio and generalized likelihood ratio detection statistics. See, for example, Sharf et al. [L. L. Scharf and B. Friedlander, "Matched Subspace Detectors," *IEEE Transactions on Signal Processing*, Vol 42. No. 8, August 1994, pp. 2146–2157], Kraut et al. [S. Kraut, L. L. Scharf, L. T. McWhorter, "Adaptive Subspace Detectors," *IEEE Transactions on Signal Processing,*" Vol. 49, No. 1, January 2001, pp. 1–16.], and Manolakis et al. [D. Manolakis, C. Siracusa, and G. Shaw, "Hyperspectral Subpixel Target Detection Using the Linear Mixing Model," IEEE Transactions on Geoscience and Remote Sensing, Vol 39, No. 7, July 2001, pp. 1392–1409]. Likelihood ratio and generalized likelihood ratio (GLR) techniques have also been applied to the convex model. For example, Manolakis et al. showed that the GLR test when $\Gamma=I_{n \times n}$, $\sigma^2$ is unknown, and W and S are known is $$T_{l,M}(y) = \left(\frac{\|P_{W^\perp}(y)\|}{\|P_{(W+S)^\perp}(y)\|}\right)^n, \quad \text{[Eqn. 4]}$$

where $P_A$ is orthogonal projection with reference to the Euclidean inner product onto the subspace A, and $A^\perp \subset R^n$ is the subspace orthogonal to A.

Spectra from a class of material are often better modeled as random rather than as fixed vectors. This may be due to biochemical and biophysical variability of materials in a scene. For such data, neither the linear mixture model nor the normal mixture model is adequate, and better classification and detection results may accrue from using more accurate methods. Stocker et al. [A. D. Stocker and A. P. Schaum, "Application of stochastic mixing models to hyperspectral detection problems," *SPIE Proceedings* 3071, *Algorithms for Multispectral and Hyperspectral Imagery III*, S. S. Shen and A. E. Iverson eds. August 1997] propose a stochastic mixture model in which each fundamental class is identified with a normally distributed random variable, i.e.

$$y_i = \sum_{k=1}^{d} a_{ik}\varepsilon_k \text{ such that } \varepsilon_k \sim N(\mu_k, \Gamma_k); a_{ik} \geq 0; \sum_{k=1}^{d} a_{ik} = 1. \quad \text{[Eqn. 5]}$$

They estimate the parameters of the model by quantizing the set of allowed abundance values, and fitting a discrete normal mixture density to the data. More precisely, let $\Delta=1/M$ denote the resolution of the quantization. Then the set of allowed coefficient sequences is $$A = \left\{(a_1, \ldots, a_d) \middle| \sum_{k=1}^{d} a_k = 1; a_k \in \{0, \Delta, \ldots, (M-1)\Delta, 1\}\right\}$$

For each $\vec{\alpha} = (\alpha_1, \ldots, \alpha_d) \in A$, define $$\mu(\vec{a}) = \sum_{j=1}^{d} a_j \mu_j \text{ and } \Gamma(\vec{a}) = \sum_{j=1}^{d} a_j^2 \Gamma_j. \quad \text{[Eqn. 6]}$$

Then the observations are fit to the mixture model $$p(y) = \sum_{\vec{a} \in A} \rho_{\vec{a}} N(\mu(\vec{a}), \Gamma(\vec{a}))(y). \quad \text{[Eqn. 7]}$$

The fitting is accomplished using a variation of the stochastic expectation maximization algorithm such that Eqn. 6 is satisfied in a least squares sense. Stocker et al. demonstrate improved classification in comparison with clustering methods using three classes, and they demonstrate detection algorithms using this model. They note, however, that the method is impractical if the data are comprised of a large number of classes or if $\Delta$ is small, as the number of elements of A, which is given by:

$$|A| = \frac{(M+1)\cdots(M+d-1)}{(d-1)!},$$

becomes very large. Furthermore, quantizing the allowed abundance values leads to modeling and estimation error.

Stocker et al. used this model to develop a known target detection statistic: the finite target matched filter (FTMF). Observations of the target, t, and background, b, are represented as samples from the normal random variable $t \sim N(\mu_1, \Gamma_1)$ and $b \sim N(\mu_0, \Gamma_1)$, respectively. An observation that consists of a fraction (1−$f$) of background material and $f$ of target material is then modeled as $y \sim N((1-f)\mu_0 + f\mu_1, (1-f)^2 \Gamma_0 + f^2 \Gamma_1) = p(y|f)$. Stocker et al. define the FTMF as the generalized likelihood ratio test:

$$T_{FTMF}(y) = \frac{\max_f p(y|f)}{p(y|f=0)}; 0 \leq f \leq 1, \quad \text{[Eqn. 8]}$$

and a detection algorithm is achieved by applying a threshold to the values of $T_{FTMF}$. A bank of FTMFs may be applied to Gaussian mixture data given by Eqns. 1 or 7.

These unresolved problems and deficiencies are clearly felt in the art and are solved by this invention in the manner described below.

SUMMARY OF THE INVENTION

A method for detecting targets comprises: a) receiving spectral data; b) using a normal compositional model for estimating background parameters from the spectral data and target components; c) estimating abundance values of classes of the normal compositional model from the background parameters and the spectral data; d) estimating target class covariance values from the spectral data, the background parameters, and the target components; e) estimating target-plus-background abundance values from the target class covariance values, the background parameters, the spectral data, and the target components; f) employing a normal compositional model for determining a likelihood ratio detection statistic from the target class covariance values, target-plus-background abundance values, spectral data, target components, background parameters, and background abundance values; and g) generating a determination output signal that represents whether an observation includes a target from the likelihood ratio detection statistic.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
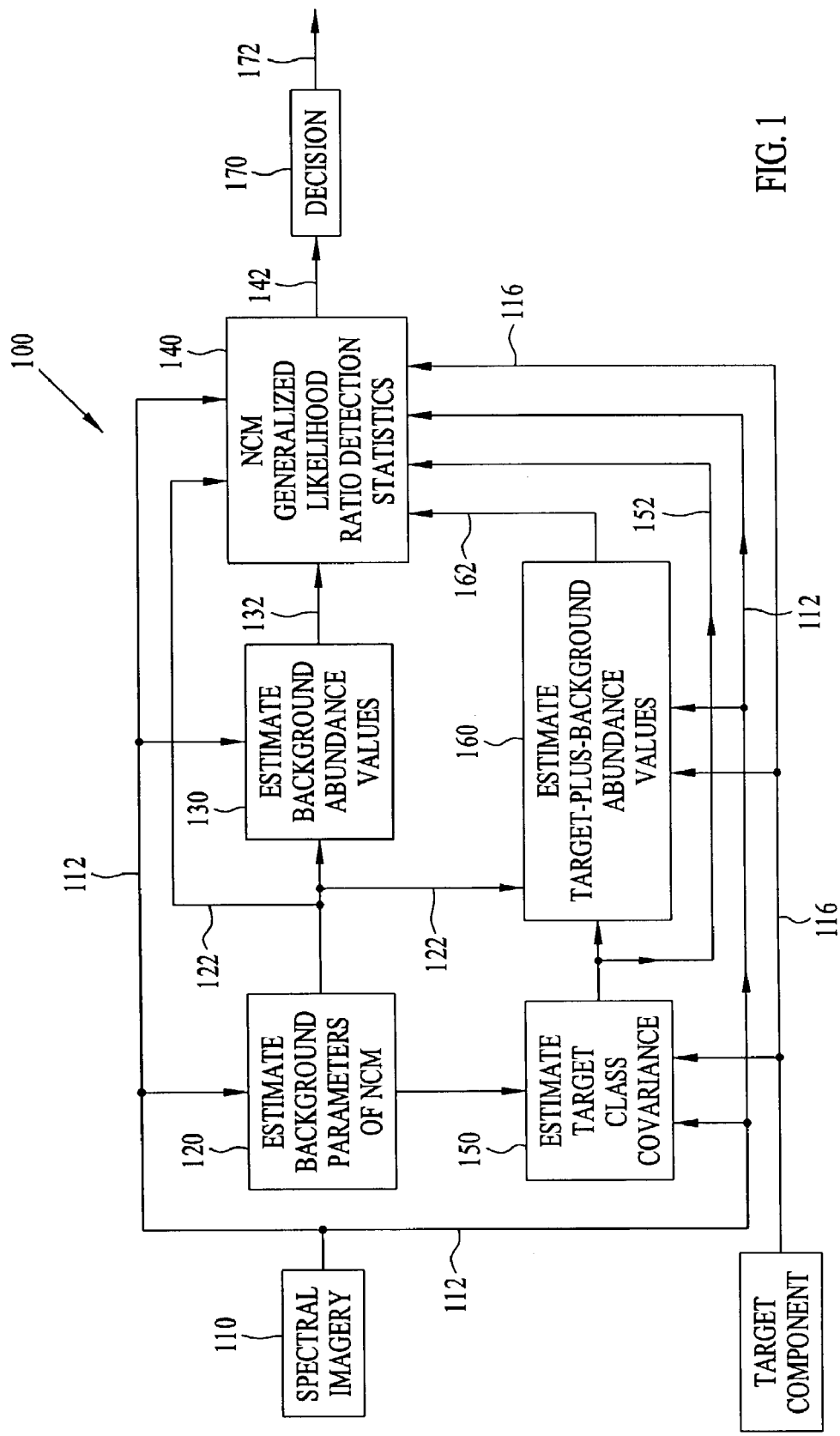
FIG. 1 is a block diagram illustrating the Normal Compositional Model Known Target Detector of this invention.
Figure 2:
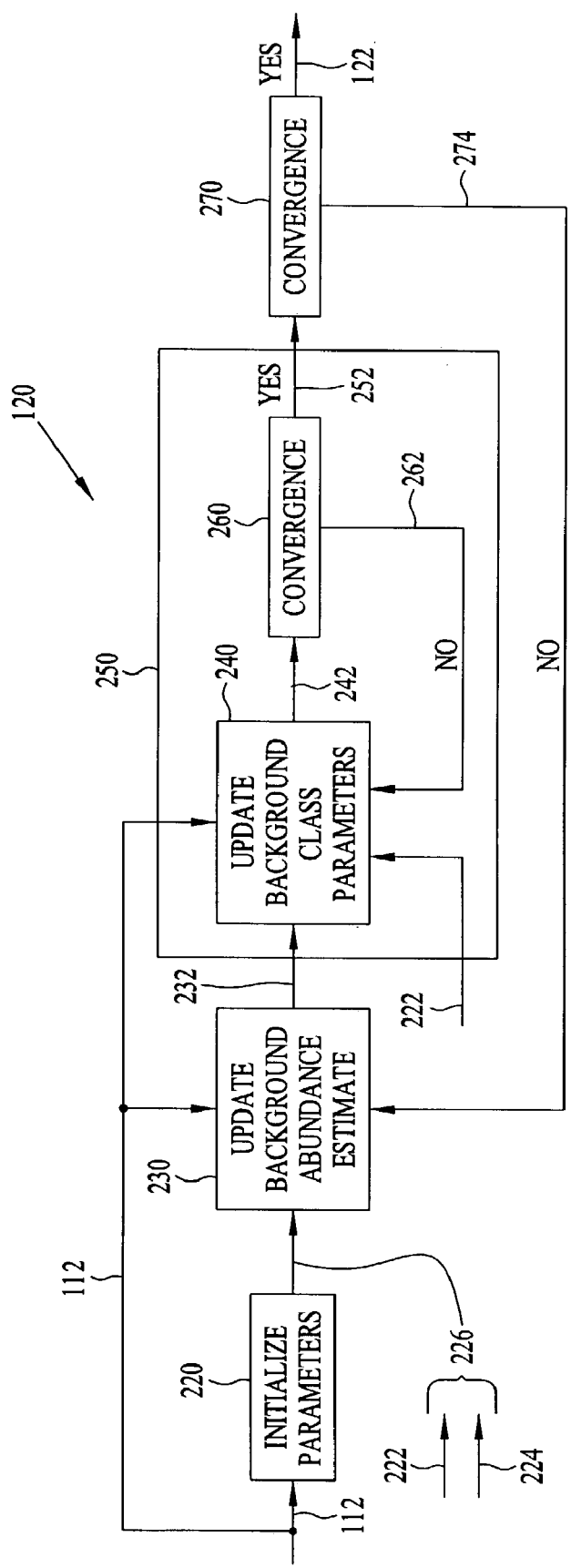
FIG. 2 is a block diagram of a flowchart illustrating the background parameter estimation method of this invention.
Figure 3:
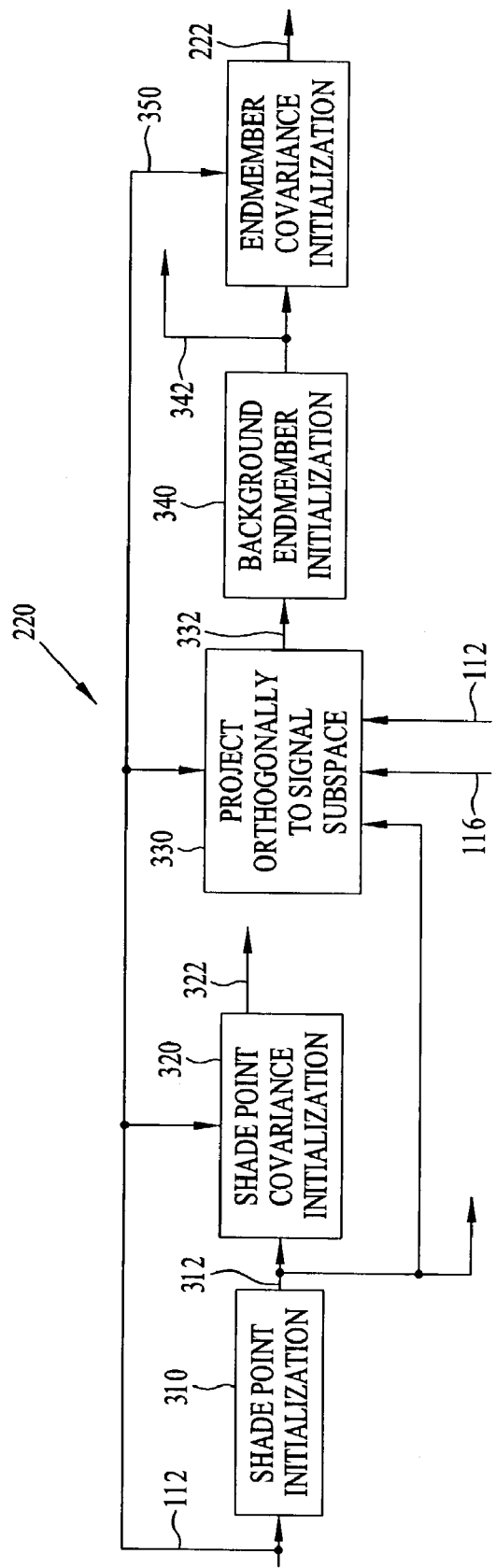
FIG. 3 is a block diagram illustrating the method of this invention for initializing the endmember classes.

The invention is used to detect known signatures from spectral imagery. The invention is operated as shown in FIGS. 1–3. As shown in FIG. 1, the major components of the invention are: estimation of the parameters of the normal compositional model (NCM) applied to the background, estimation of the covariance matrices of the target classes, estimation of the abundance values of the classes of the NCM using the background only and the background and target models, computation of the detection statistic, and application of a decision criterion to infer, based on the values of the GLR detection statistic, if there is a target of the given type at any pixel. These steps are elucidated below.

1. Normal Compositional Model (NCM)

The normal compositional model (NCM) represents each observation $y_i \in R^n$ as:

$$y_i = c\eta + \sum_{k=1}^{d} a_{ki}\varepsilon_k \text{ such that} \quad \text{[Eqn. 9]}$$

$$0 \leq a_{ki}, \text{ and} \quad \text{(c.1)}$$

$$\sum_{k=1}^{d} a_{ki} = 1 \text{ or} \quad \text{(c.2.a)}$$

$$\sum_{k=1}^{d} a_{ki} \leq 1 \quad \text{(c.2.b)}$$

or other constraints, where $\epsilon_k, \eta \in R^n$ are random vectors such that $\epsilon_k \sim N(\mu_k, \Gamma_k)$, $\eta \sim N(\mu_0, \Gamma_0)$ and c=0,1. The number of classes used in the model of the background is $d=d_0$, and the number of classes used in the background-plus-target model is $d=d_1=d_0+d_s$, where $d_s$ is the number of target components. Assuming that $\Gamma_k \neq 0$ for all $1 \leq k \leq d$, we do not require the linear independence of the background and or target mean vectors. Constraint c.2.b may be used in place of c.2.a to account for variations in scale or as in remote sensing, scalar variations in illumination. Applied to remote sensing data, $\eta$ models path radiance, additive sensor noise, and other additive terms. By choosing c=0, and constraints c.1 and c.2.a, the model reduces to the Schaum-Stocker model (Eqn. 5). Although, with this choice of parameters and constraints the present invention has advantages over the Schaum-Stocker approach because the estimation procedure does not confine the abundance values to preselected quantized values. Therefore, it is not restricted to a small number of classes and it provides more accurate estimates of class parameter and abundance values. This model reduces to the convex and linear mixing models (Eqn. 3) by choosing $\Gamma_k=0$ for all $1 \leq k \leq d$ and C=1, although the parameter estimation technique described below will not refine initial estimates of the $\mu_k$ in this case. It does, however, provide a maximum likelihood approach to estimating the parameters of the distribution of $\eta$. Furthermore, if $\Gamma_k=0$ for all $1 \leq k \leq d$ and c=1, the NCM reduces to the linear or convex mixture models if the constraints c.1 and c.2.a or c.2.b are not or are imposed, respectively. Furthermore, by imposing the constraints c.2.a and $\alpha_{ki}=0,1$ for each $1 \leq i \leq N$, exactly one of $\alpha_{ki}=1$, and the model encompasses the Gaussian mixture model (Eqn. 1). Whereas specialized constraints applied to the parameters of the NCM reduce it to the older models, in general, without imposing special constraints, the NCM provides a model having higher likelihood than these alternatives.

2. Parameter Estimation

The parameter estimation module is illustrated in FIG. 2 and described below.

A. Initialization

The initialization module is depicted in FIG. 3. The mean value of the additive term $\eta$ is obtained as a virtual shade point, and the covariance of the additive term is estimated as the sample covariance of a cluster of points near $\eta$. The data are transformed using the projection operator that is zero on the subspace spanned by the set of signal spectra. Initial estimates of the background class means are obtained by applying deterministic linear unmixing techniques to the transformed data to determine a set of endmembers. Several methods of estimating endmembers are available. These estimates of the endmembers in the transformed space are pulled back to the original data space to obtain estimates of the background endmembers. These background endmembers serve as initial values of the background class mean spectra. The initial covariance of each class is obtained as the sample covariance of a cluster of points near the class mean.

B. Updating Abundance Estimates (UA)

For given parameters $(\mu_k, \Gamma_k)$, $1 \leq k \leq d$, and given abundances $\alpha_i = (\alpha_{1i}, \ldots, \alpha_{di})$, let $$\mu(\alpha_i) = \sum_{k=1}^{d} a_{ki}\mu_k \quad \text{[Eqn. 10]}$$

$$\Gamma(\alpha_i) = \sum_{k=1}^{d} (a_{ki})^2 \Gamma_k. \quad \text{[Eqn. 11]}$$

Then, $y_i \sim N(\mu(\alpha_i)+\mu_0, \Gamma(\alpha_i)+\Gamma_0)$. Maximum likelihood abundance estimates are thus obtained by solving $$\hat{\alpha}_i = \arg\left\{\max_{\alpha_i} \left(\frac{1}{|\Gamma(\alpha_i)+\Gamma_0|^{0.5}(2\pi)^{\frac{n}{2}}} \exp\left(\frac{-1}{2}(y_i - (y_i - \mu(\alpha_i) - \mu_0)^T (\Gamma(\alpha_i)+\Gamma_0)^{-1}(y_i - \mu(\alpha_i) - \mu_0)\right)\right)\right\} \quad \text{[Eqn. 12]}$$

subject to the constraints c.1, and c.2.a, or c.2.b, or other constraints.

C. Update Class Parameters (UP)

For given abundance estimates, the class parameters of the background, $$\Omega = \{(\mu_k, \Gamma_k) | 0 \leq k \leq d\},$$

may be estimated by applying the expectation-maximization (EM) algorithm. Let $$\Omega' = \{(\mu_k', \Gamma_k') | 0 \leq k \leq d\}$$

denote the estimate of the parameters after the $r^{th}$ iteration of the EM algorithm. Given the abundance values $\{\alpha_{ki} | 1 \leq i \leq N, 1 \leq k \leq d\}$, define $$\delta_i^r = [\Gamma^r(\alpha_i) + c\Gamma_0^r]^{-1}(y_i - \mu^r(\alpha_i) - c\mu_0^r),$$

$$\psi_{ki}^r = \alpha_{ki}\delta_i^r, \bar{\delta}^r = \frac{1}{N}\sum_{i=1}^{N}\delta_i^r, \text{ and } \bar{\psi}_k^r = \frac{1}{N}\sum_{i=1}^{N}\psi_{ki}^r.$$

The EM update equations are:

$$\mu_k^{r+1} = \mu_k^r + \Gamma_k^r \bar{\psi}_k^r, \text{ for } 1 \leq k \leq d. \qquad \text{[Eqn. 13a]}$$

$$\mu_0^{r+1} = \mu_0^r + \Gamma_0^r \bar{\delta}^r. (c = 1) \qquad \text{[Eqn. 13b]}$$

$$\Gamma_k^{r+1} = \Gamma_k^r - \Gamma_k^r \left(\frac{1}{N}\sum_{i=1}^{N}\alpha_{ki}^2 [\Gamma^r(\alpha_i) + c\Gamma_0^r]^{1}\right)\Gamma_k^r + \qquad \text{[Eqn. 13c]}$$

$$\Gamma_k^r \left(\frac{1}{N}\sum_{i=1}^{N}\psi_{ki}^r \psi_{ki}^{r T} - \bar{\psi}_{ki}^r \bar{\psi}_{ki}^{r T}\right)\Gamma_k^r, \text{ for } 1 \leq k \leq d.$$

$$\Gamma_0^{r+1} = \Gamma_0^r - \frac{1}{N}\Gamma_0^r \sum_{i=1}^{N} c^2 [\Gamma^r(\alpha_i) + c\Gamma_0^r]^{-1}\Gamma_k^r + \qquad \text{[Eqn. 13d]}$$

$$\Gamma_0^r \left(\frac{1}{N}\sum_{i=1}^{N}\delta_i^r \delta_i^{r T} - \bar{\delta}^r \bar{\delta}^{r T}\right)\Gamma_0^r. (c = 1)$$

The class parameters are updated (UP) using the expectation-maximization equations (13) and the current abundance estimates $\{\alpha_{ki}^j\}$. Likelihood increases with each iteration of UA or UP. Thus, a sequence of parameter estimates of increasing likelihood is obtained by the application of a sequence of updates: UA,UP,UA,UP, . . . . The iteration is halted when a convergence criterion is satisfied.

3. Detection Algorithms

Given parameters of the background and the target classes, the generalized likelihood ratio test may be computed. Let $\alpha_{i0}$ and $\alpha_{i1}$ denote the abundance estimates obtained by solving (Eqn. 12) using only the background classes and the combination of background and target classes, respectively. The log of the likelihood function given the abundance and parameter values is $$L(y_i|\alpha_{ij}) = \qquad \text{[Eqn. 14]}$$
$$-\frac{1}{2}\log(|\Gamma(\alpha_{ij}) + \Gamma_0|) - \frac{n}{2}\log(2\pi) - \frac{1}{2}(y_{ij} - \mu(\alpha_{ij}) - \mu_0)^t$$
$$(\Gamma(\alpha_{ij}) + \Gamma_0)^{-1}(y' - \mu(\alpha_{ij}) - \mu_0), j = 0, 1,$$

and the generalized likelihood ratio is $$T_K(y_i) = \frac{L(y_i|\alpha_{i1})}{L(y_i|\alpha_{i0})}. \qquad \text{[Eqn. 15]}$$

An inference concerning the presence of a target in pixel i is made based on the values of $T_K(y_i)$. A threshold $\tau$ is determined that corresponds to an attribute of the test, e.g., probability of false alarm, by analyzing the probability distribution of $T_K(y_i)$ applied to background data. The decision criterion is then $$T_K(y_i) \mathop{\gtrless}_{H_0}^{H_1} \tau. \qquad \text{[Eqn. 16]}$$

The class parameters may be updated using a segmented expectation maximization algorithm in place of the expectation-maximization algorithm. In this approach a lower threshold, possibly zero, is placed on the abundance of a class, and only those pixels for which the abundance exceeds the threshold are utilized in the update of the associated class parameters. This approach saves computations and improves the speed of convergence of the parameter estimates.

Rather than solving for the maximum likelihood value of the abundance estimates in the parameter estimation phase of the operation, random samples of the abundance estimates may be generated and these may be used in place of the maximum likelihood estimates in the updating of the class parameters.

For parameter estimation, the image may be culled of spectra that are sufficiently close to the target spectra in order to further reduce the bias in the estimate of background parameters from data that may also contain targets.

The processing may be conceived of as applying two models to the data: 1) the background only model, and 2) the background and target model. In the description above, the background parameters were estimated only once. Alternatively, one could estimate parameters of the background only model and separately estimate parameters of the background-plus-target model.

Referring to FIG. 1, there is shown a block diagram of an embodiment of a process 100 for detecting targets. Spectral data 112 that may be generated at step 110 is received at step 120 which uses a normal compositional model, as defined above, for estimating background parameters 122 from the spectral data 112 and target components 116. Next, step 130 estimates abundance values 132 of classes of the normal compositional model from the background parameters 122 and spectral data 112. Target class covariance values 152 are estimated at step 150 from the spectral data 112, background parameters 122, and target components 116. Then, step 160 estimates target-plus-background abundance values 162 from the target class covariance values 152, background parameters 122, spectral data 112, and target components 116. A normal compositional model is employed at step 140 for determining a likelihood ratio detection statistic 142 from the target class covariance values 152, target-plus-background abundance values 162, spectral data 112, target components 116, background parameters 122, and background abundance values 132. Finally, at step 170, a determination output signal 172 is generated from the likelihood ratio detection statistic 142 that represents whether an observation includes a target.

Referring to FIG. 2, step 120 for estimating background parameters 122 is further shown to include step 220 for initializing current class parameters 222 and current abundance estimates 224. Then, step 230 defines updated abundance estimates 232 from the current class parameters 222 and spectral data 112. Step 250 determines converged class parameter candidates 252 from the updated abundance estimates 232, current class parameters 222, and spectral data 112. At step 270, the background parameters 122 are generated if the converged class parameter candidates 252 satisfy first convergence criteria. If the first converged class parameters 252 do not satisfy the first convergence criteria, then step 270 generates a non-convergence signal 274 that is provided to step 230, to which step 120 returns.

Step 250 for determining converged class parameter candidates 252 further includes step 240 for creating updated background class parameters 242 from the current class parameters 222, updated abundance estimates 232, and spectral data 112, and step 260 for generating converged class parameter candidates 252 if the background class parameters 242 satisfy second convergence criteria. However, if the background class parameters 242 do not satisfy second convergence criteria, then step 260 generates a non-convergence signal that is provided to step 240, to which step 250 returns.

FIG. 3 further illustrates step 220 for initializing the current class parameters 222 which is shown to include: a) step 310 for defining a shade point offset value 312; b) step 320 for defining a shade point covariance value 322 from the shade point offset value 312 and spectral data 112; c) step 330 for generating reduced spectral data 332 from the spectral data 112, target components 116, and shade point offset value 312; d) step 340 for defining end members 342 from the reduced spectral data 332; and e) step 350 for generating the current class parameters 222 from the end members 342 and spectral data 112.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A method for detecting targets, comprising:
   a) receiving spectral data;
   b) using a normal compositional model for estimating background parameters from said spectral data and target components;
   c) estimating abundance values of classes of said normal compositional model from said background parameters and said spectral data;
   d) estimating target class covariance values from said spectral data, said background parameters, and said target components;
   e) estimating target-plus-background abundance values from said target class covariance values, said background parameters, said spectral data, and said target components;
   f) employing a normal compositional model for determining a likelihood ratio detection statistic from said target class covariance values, said target-plus-background abundance values, said spectral data, said target components, said background parameters, and background abundance values; and
   g) generating a determination output signal that represents whether an observation includes a target from said likelihood ratio detection statistic.

2. The method of claim 1 wherein estimating background parameters further includes:
   h) initializing current class parameters and current abundance estimates;
   i) defining updated abundance estimates from said current class parameters;
   j) determining converged class parameter candidates from said updated abundance estimates and said current class parameters; and
   k) generating said background parameters if said converged class parameter candidates satisfy first convergence criteria, or returning to said defining updated abundance estimates if said converged class parameter candidates do not satisfy said first convergence criteria.

3. The method of claim 2 wherein determining said converged class parameter candidates further includes:
   l) creating updated background class parameters from said current class parameters and said updated abundance estimates; and
   m) generating said converged class parameter candidates if said background class parameters satisfy second convergence criteria, or returning to said creating updated current class parameters if said background class parameters do not satisfy said second convergence criteria.

4. The method of claim 2 wherein initializing said current class parameters includes:
   n) defining a shade point offset value;
   o) defining a shade point covariance value from said shade point offset value;
   p) generating reduced spectral data from said spectral data, said target components, and said shade point offset value;
   q) defining end members from said reduced spectral data; and
   r) generating said current class parameters from said end members.

5. The method of claim 1 wherein said spectral data is detected by an imaging spectrometer.

6. The method of claim 1 wherein said spectral data represents surface spectra.

7. A computer program product, comprising;
   a computer readable medium having computer readable program code means embodied thereon for detecting anomalies in spectral data, said computer readable program code means including:
   a) first computer readable program means for receiving spectral data;
   b) second computer readable program means for using a normal compositional model for estimating background parameters from said spectral data and target components;
   c) third computer readable program means for estimating abundance values of classes of said normal compositional model from said background parameters and said spectral data;
   d) fourth computer readable program means for estimating target class covariance values from said spectral data, said background parameters, and said target components;
   e) fifth computer readable program means for estimating target-plus-background abundance values from said target class covariance values, said background parameters, spectral data, and said target components;
   f) sixth computer readable program means for employing a normal compositional model for determining a likelihood ratio detection statistic from said target class covariance values, said target-plus-background abundance values, said spectral data, target components, said background parameters, and background abundance values; and
   g) seventh computer readable program means for generating a determination output signal that represents whether an observation includes a target from said likelihood ratio detection statistic.

8. The computer program product of claim 7 wherein said second computer readable program means further includes:

h) eighth computer readable program means for initializing current class parameters and current abundance estimates;

i) ninth computer readable program means for defining updated abundance estimates from said current class parameters;

j) tenth computer readable program means for determining converged class parameter candidates from said updated abundance estimates and said current class parameters; and k) eleventh computer readable program means for generating said background parameters 2 if said converged class parameter candidates satisfy first convergence criteria or returning to said defining updated abundance estimates if said converged class parameter candidates do not satisfy said first convergence criteria.

9. The computer program product of claim 8 wherein said tenth computer readable program means further includes:

l) twelfth computer readable program means for creating updated background class parameters from said current class parameters and said updated abundance estimates; and m) thirteenth computer readable program means for generating said converged class parameter candidates if said background class parameters satisfy second convergence criteria, or returning to said creating updated current class parameters if said background class parameters do not satisfy said second convergence criteria.

10. The computer program product of claim 9 wherein said eighth computer readable program means further includes:

n) fourteenth computer readable program means for defining a shade point offset value;

o) fifteenth computer readable program means for defining a shade point covariance value from said shade point offset value;

p) sixteenth computer readable program means for generating reduced spectral data from said spectral data, said target components, and said shade point offset value;

q) seventeenth computer readable program means for defining end members from said reduced spectral data; and r) eighteenth computer readable program means for generating said current class parameters from said end members.

11. A system for detecting targets, comprising:

a computer for executing a sequence of computer readable instructions for performing the processes of:

a) receiving spectral data;

b) using a normal compositional model for estimating background parameters from said spectral data and target components;

c) estimating abundance values of classes of said normal compositional model from said background parameters and said spectral data;

d) estimating target class covariance values from said spectral data, said background parameters, and said target components;

e) estimating target-plus-background abundance values from said target class covariance values, said background parameters, spectral data, and said target components;

f) employing a normal compositional model for determining a likelihood ratio detection statistic from said target class covariance values, said target-plus-background abundance values, said spectral data, said target components, said background parameters, and background abundance values; and g) generating a determination output signal that represents whether an observation includes a target from said likelihood ratio detection statistic.

12. The system of claim 11 wherein estimating background parameters further includes:

h) initializing current class parameters and current abundance estimates;

i) defining updated abundance estimates from said current class parameters;

j) determining converged class parameter candidates from said updated abundance estimates and said current class parameters; and k) generating said background parameters if said converged class parameter candidates satisfy first convergence criteria or returning to said defining updated abundance estimates if said converged class parameter candidates do not satisfy said first convergence criteria.

13. The system of claim 12 wherein determining said converged class parameter candidates further includes:

l) creating updated class parameters from said current class parameters and said updated abundance estimates; and m) generating said converged class parameter candidates if said background class parameters satisfy second convergence criteria, or returning to said creating updated current class parameters if said background class parameters do not satisfy said second convergence criteria.

14. The system of claim 12 wherein initializing said current class parameters include:

n) defining a shade point offset value;

o) defining a shade point covariance value from said shade point offset value;

p) generating reduced spectral data from said spectral data, said target components, and said shade point offset value;

q) defining end members from said reduced spectral data; and r) generating said current class parameters from said end members.

* * * * *